United States Patent
Dupuis et al.

[11] Patent Number: 6,093,487
[45] Date of Patent: Jul. 25, 2000

[54] POLYMER/CACO$_3$ COMPOSITE CORE/SHEATH PARTICULATES AND HOLLOW CACO$_3$ MICROBEADS PREPARED THEREFROM

[75] Inventors: Dominique Dupuis, Deuil-la-Barre; Dominique Labarre, Neuilly sur Seine; Gilles Mur, Saint Maur des Fosses, all of France

[73] Assignee: Rhone-Poulenc Chimie, Courbevoie Cedex, France

[21] Appl. No.: 09/055,271

[22] Filed: Apr. 6, 1998

Related U.S. Application Data

[62] Division of application No. 08/523,527, Sep. 1, 1995, Pat. No. 5,756,210.

[30] Foreign Application Priority Data

Sep. 2, 1994 [FR] France .................................. 94 10545

[51] Int. Cl.$^7$ ....................................... B32B 5/16
[52] U.S. Cl. ........................... 428/330; 428/403; 428/407
[58] Field of Search ...................... 428/330, 403, 428/407

[56] References Cited

U.S. PATENT DOCUMENTS

| | | | |
|---|---|---|---|
| 5,378,533 | 1/1995 | Ota ........................................ | 428/304.4 |
| 5,380,360 | 1/1995 | Noguchi et al. ......................... | 106/415 |
| 5,443,910 | 8/1995 | Gose et al. .............................. | 428/407 |
| 5,567,521 | 10/1996 | Nishida et al. .......................... | 428/403 |

FOREIGN PATENT DOCUMENTS

A-0 442 569   8/1991   European Pat. Off.

OTHER PUBLICATIONS

Database WPI, Derwent Publications Ltd., London GB; AN 84–096950[16] & JP-A-59 041 256 (TOYO SODA MGF KK), Mar. 7, 1994.

Database WPI, Derwent Publications Ltd., London GB; AN 93–231655[29] & JP-A-5 154 374 (KAWATETSU KOGYO KK), Jun. 22, 1993.

Database WPI, Derwent Publications Ltd., London GB; AN 80–87565C[49] & JP-A-50 123 574 (MITSUI PETROCHEM IND. KK) Sep. 29, 1975.

Database WPI, Derwent Publications Ltd., London GB; AN 93–140038[17] & JP-A-5 077 325 (ISUZU MOTORS LTD.) Mar. 30, 1993.

Database WPI, Derwent Publications Ltd., London GB; AN 79–67333B[37] & JP-A-79 024 399 (TOKUYAMA SODA KK) Aug. 21, 1979.

Database WPI, Derwent Publications Ltd., London GB; AN 94–221554[27] & JP-A-6 157 030 (HISHIKO SEKITAN KOGYO KK) Jun. 3, 1994.

*Primary Examiner*—Hoa T. Le
*Attorney, Agent, or Firm*—Burns, Doane, Swecker & Mathis, L.L.P.

[57] ABSTRACT

Composite core/sheath particulates comprising an organic polymer core at least partly coated with calcium carbonate, these core/sheath particulates having a mean particle size not exceeding 5 $\mu$m, well suited for reinforcing plastic/elastomer substrates, are conveniently converted, e.g., via calcination, into hollow calcium carbonate microbeads which comprise CaCO$_3$ shells having a mean particle size not exceeding 5 $\mu$m; such hollow microbeads are themselves well suited for enhancing the low-temperature flexibility of elastomer substrates, notably vehicle tires.

8 Claims, No Drawings

POLYMER/CACO₃ COMPOSITE CORE/SHEATH PARTICULATES AND HOLLOW CACO₃ MICROBEADS PREPARED THEREFROM

This application is a divisional of application Ser. No. 08/523,527, filed Sep. 1, 1995, now U.S. Pat. No. 5,756,210.

BACKGROUND OF THE INVENTION

1. Technical Field of the Invention

The present invention relates to novel composite core/sheath particulates based on organic polymers and calcium carbonate, to hollow calcium carbonate particles or beads prepared therefrom and to liquid suspensions of such particulates and hollow $CaCo_3$ beads.

This invention also relates to processes for the preparation of the subject novel particles and suspensions thereof and to the use of same as fillers or additives in plastics and elastomers.

2. Description of the Prior Art

Calcium carbonate is known to impart good rigidity to thermoplastic substrates by formulating particles thereof, having a particle size on the micron order, into the plastic. The latter then exhibits certain improved physical properties.

However, it too is known that plastics reinforced with calcium carbonate become much more brittle and their impact strength is weakened.

Further, inorganic fillers comprising particles of silica or carbon black have been formulated into elastomers and, in particular, into elastomers used for the manufacture of vehicle tires, to improve the tear and abrasion resistance of the elastomers. In turn, however, these reinforced tires lack flexibility at low temperature.

SUMMARY OF THE INVENTION

Accordingly, a major object of the present invention is the provision of novel filler material permitting the impact strength and rigidity properties of plastic substrates to be conjointly reinforced, as well as a process for the production of such novel filler material.

Another object of this invention is the provision of a novel additive that imparts low-temperature flexibility to elastomers and also a process for the shaping thereof.

Briefly, the present invention features composite core/sheath particulates comprising an organic polymer core at least partly covered or coated with calcium carbonate and having a mean diameter not exceeding 5 $\mu$m.

The present invention also features hollow particles or microbeads comprising shells of calcium carbonate having a mean diameter or particle size not exceeding 5 $\mu$m.

This invention also features liquid suspensions of the above composite particles and the above hollow shells.

Too, this invention features a process for the preparation of a suspension of the above composite particles comprising contacting a latex with calcium dihydroxide and adding carbon dioxide to the mixture of latex and calcium dihydroxide thus obtained, whereby calcium carbonate precipitates onto the latex particles.

The present invention next features a process for the preparation of the above composite particles, by drying the aforesaid suspensions.

This invention also features a process for the preparation of the above hollow particles, either by calcining the subject composite particles, or by introducing said composite particles into a solvent for the organic polymer, whereby the organic polymer core is dissolved, then centrifuging the mixture and drying the hollow particles thus obtained.

Lastly, this invention features fillers or additives for plastics and elastomers comprising said composite particulates, and filler material for elastomers which comprises said hollow particles.

DETAILED DESCRIPTION OF BEST MODE AND PREFERRED EMBODIMENTS OF THE INVENTION

More particularly according to the present invention, the subject composite particles comprise an organic polymer core at least partly covered or coated with calcium carbonate and which have a diameter not exceeding 5 $\mu$m.

The composite core/sheath particulates according the invention are particles of organic polymer, the external face surface of which is at least partly covered with a precipitate of calcium carbonate. The calcium carbonate may coat each organic polymer core either partly or completely. It is also possible for the calcium carbonate to be partly embedded in the outer peripheral layer or external face surface of the organic polymer core.

These composite core/sheath particles are generally spherical in shape.

The calcium carbonate is typically in calcite form.

The nature of the organic polymers constituting a portion of the composition of the composite particles is of the type of latex particles, namely, particles of (co)polymers originating from conventional processes for emulsion (co)polymerization of copolymerizable organic monomers.

Exemplary of these (co)polymers are the polymerizates of the following monomers:

(a) Alkyl, hydroxyalkyl and chloroalkyl (meth)acrylates and alkyl or hydroxyalkyl chloroacrylates, in which the alkyl radical preferably has from 1 to 8 carbon atoms, such as:
Methyl (meth)acrylate,
Ethyl or hydroxyethyl (meth)acrylate,
Propyl or hydroxypropyl (meth)acrylate,
N-butyl, isobutyl or hydroxybutyl (meth)acrylate,
Amyl, lauryl and/or isoamyl (meth)acrylate,
2-Ethylhexyl, ethyl, octyl, methyl, butyl, 3,3'-dimethylbutyl, isobutyl and/or isopropyl (meth)acrylate,
Chloroethyl (meth)acrylate,
Butyl, methyl, ethyl, isopropyl and/or cyclohexyl chloroacrylate; etc.

(b) Vinyl or allyl esters of linear or branched $C_1$–$C_{12}$ saturated carboxylic acids, such as:
Vinyl acetate,
Vinyl propionate,
Vinyl butyrate,
Allyl acetate,
Vinyl versatate® (registered trademark for esters of $C_9$–$C_{11}$ α-branched acids),
Vinyl laurate,
Vinyl benzoate,
Vinyl trimethylacetate,
Vinyl pivalate,
Vinyl trichloroacetate; etc.

(c) Esters and half-esters of α,β-ethylenically unsaturated polycarboxylic acids having from 4 to 24 carbon atoms, such as:

Methyl, dimethyl, ethyl, butyl and/or 2-ethylhexyl fumarate,

Methyl, dimethyl, ethyl, butyl and/or 2-ethylhexyl maleate; etc.

(d) Vinyl halides, such as:

Vinyl and/or vinylidene chloride and/or fluoride; etc.

(e) Fluoroolefins, such as tetrafluoroethylene, etc.

(f) Vinylaromatic compounds preferably having not more than 24 carbon atoms and, in particular:

Styrene,

α-Methylstyrene, 4-methylstyrene, 2-methylstyrene, 3-methylstyrene,

4-Methoxystyrene,

2-Hydroxymethylstyrene,

4-Ethylstyrene,

4-Ethoxystyrene, 3,4-Dimethylstyrene,

2-Chlorostyrene, 3-chlorostyrene,

4-Chloro-3-methylstyrene,

4-Tert-butylstyrene,

4-Dichlorostyrene, 2,6-dichlorostyrene, 2,5-difluorostyrene,

1-Vinylnaphthalene,

Vinyltoluene; etc.

(g) Conjugated aliphatic dienes preferably having from 3 to 12 carbon atoms, such as:

1,3-Butadiene,

Isoprene

2-Chloro-1,3-butadiene; etc.

(h) α,β-Ethylenically unsaturated nitriles preferably having from 3 to 6 carbon atoms, such as acrylonitrile and methacrylonitrile.

Certain of these principal monomers can be copolymerized with up to 10 by weight of other comonomers, ionic in nature, such as:

(a') The α,β-ethylenically unsaturated carboxylic acid monomers indicated above, including mono- and polycarboxylic acids, such as:

Acrylic acid,

Methacrylic acid,

Maleic acid,

Itaconic acid,

Fumaric acid,

Crotonic acid, etc.

(b') Ethylenic monomers containing secondary, tertiary or quaternized amine groups, such as vinylpryridines, diethylaminoethyl methacrylate, etc.

(c') Sulfonated ethylenic monomers, such as vinyl sulfonate, styrene sulfonate, etc.

(d') Zwitterionic ethylenic monomers, such as sulfopropyl (dimethylaminopropyl) acrylate, etc.

(e') Amides of unsaturated carboxylic acids such as acrylamide, methacrylamide, etc.

(f') Esters of (meth)acrylates and of polyhydroxypropyl or polyhydroxyethylated alcohols.

Anionic polymers, such as polyvinyl acetate, or amphoteric polymers, are also suitable according to the present invention.

Copolymers of styrene with acrylates are more particularly preferred. These are advantageously selected from among butadiene/styrene copolymers containing carboxylate, sulfate or sulfonate functional groups, and butadiene/styrene/acrylamide copolymers.

In the composite particles of this invention, the organic polymer is preferably an organic polymer having a carboxylate functional group content ranging from 1% to 50% by weight of ion-forming monomers, or ionomers, present therein and also having an amide functional group content less than 5% by weight of ion-forming monomers present in the organic polymer.

These organic polymers will generally have a glass transition temperature of from −80° C. to 200° C.

The subject composite particles typically have a dispersion index of not more than 0.50 and preferably less than 0.30.

The dispersion index is determined, here and in respect of all other dispersion indices indicated herein, by the formula:

$$I = \frac{\emptyset_{84} - \emptyset_{16}}{2\emptyset_{50}}$$

in which:

$\emptyset_{84}$ is the particle diameter in the instance wherein 84% of the particles have a diameter smaller than $\emptyset_{84}$;

$\emptyset_{16}$ is the particle diameter in the instance wherein 16% of the particles have a diameter smaller than $\emptyset_{16}$; and $\emptyset_{50}$ is the mean particle diameter.

The dispersion index is measured by transmission electron microcopy (TEM).

The composite particles according to the invention have a mean diameter not exceeding 5 μm. Similarly, it is typically at least 0.04 μm and preferably ranges from 0.1 to 0.3 μm. The determination of the mean diameter of these particles, and of that of all other particles indicated, is measured via TEM.

The diameter of the organic polymer core typically ranges from 0.04 to 5 μm. The thickness of the shell or the layer of calcium carbonate generally does not exceed 200 nm. Similarly, it is typically at least 1 nm, preferably at least 5 nm and more preferably ranges from 5 to 70 nm.

The dimensions indicated above are given purely by way of example, because it may be more or less difficult to determine strictly accurately the size of the organic polymer core and the thickness of the calcium carbonate, insofar as, as indicated above, the latter may be embedded in the outer peripheral layer of the organic polymer core because the organic polymer is soft and deformable. In the event that the organic polymer is soft, for example when it is at a temperature above its glass transition temperature, the calcium carbonate can become embedded therein. The measurements of the size of the organic polymer core and of the thickness of the calcium carbonate will therefore be modified as a result of the existence of an intermediate layer emanating from the interaction between the organic polymer and the calcium carbonate.

The composite particles according to the invention preferably have a specific surface area ranging from 1 to 100 m²/g.

By "specific surface" is intended the BET specific surface area determined by nitrogen adsorption in accordance with ASTM standard D 3663-78, established from the Brunauer/Emmett/Teller technique described in *Journal of the American Chemical Society*, 60, 309 (1938).

This specific surface may reveal the more or less smooth appearance of the layer of calcium carbonate on the organic polymer.

This invention also features hollow particles comprising calcium carbonate shells having a mean diameter not exceeding 5 μm.

The thickness of the calcium carbonate shell generally does not exceed 200 nm. Similarly, it is usually at least 1 nm in thickness, preferably at least 5 nm and more preferably ranges from 5 to 70 nm.

These particles are generally spherical in shape.

The calcium carbonate is preferably in calcite form.

These hollow particulates typically have a dispersion index not exceeding 0.05 and which preferably is less than 0.30.

These hollow particulates have a mean diameter not exceeding 5 $\mu$m. Similarly, it is typically at least 0.04 $\mu$m and preferably ranges from 0.1 to 0.3 $\mu$m.

The subject hollow particles preferably have a specific surface ranging from 1 to 100 $m^2/g$.

The present invention also features suspensions including the composite particles comprising an organic polymer core at least partly covered or coated with calcium carbonate.

In certain instances these suspensions will be colloidal dispersions. Thus, by "colloidal dispersion" is intended any system of fine particles of colloidal dimensions of organic polymer which are covered with calcium carbonate, in suspension in an, especially aqueous liquid phase. It should be appreciated that the calcium carbonate may be present either completely in the colloids, or, simultaneously, in the form of ions and in the colloids, without, however, the proportion represented by the ionic form exceeding approximately 10% of the total of the calcium carbonate in the colloidal dispersion. According to this invention, colloidal dispersions are preferably employed in which the calcium carbonate is completely in the colloidals.

As indicated above, it is also possible for the calcium carbonate to be partly embedded in the outer peripheral layer of the organic polymer core.

The composite particles in these suspensions have the same characteristics of mean diameter, dispersion index, specific surface and thickness of the shell, or of the layer of calcium carbonate, as the composite particles defined above.

The liquid phase is an aqueous or, optionally, hydroalcoholic phase.

Too, this invention features suspensions including hollow particles comprising a calcium carbonate shell. The liquid phase is generally aqueous or hydroalcoholic.

The hollow particles in the suspensions thereof have the same characteristics of mean diameter, dispersion index, specific surface and shell thickness as the hollow particles described above.

The process for the preparation of a suspension of composite particles according to the invention includes the following stages:

(a) contacting a latex with calcium dihydroxide, and (b) adding carbon dioxide to the mixture of latex and calcium dihydroxide obtained above, whereby calcium carbonate precipitates onto the latex particles.

The liquid phase of this starting latex is generally an aqueous phase and, preferably, water. In the event that the latices have been obtained by dispersion copolymerization of organic monomers, the liquid phase may be hydroalcoholic.

The nature of the latex particles is of the type of the polymers of the composite particles described above.

The calcium dihydroxide is preferably in the form of a suspension of calcium dihydroxide particles of variable size. This calcium dihydroxide suspension may be obtained by various means: from calcium oxide or from a calcium salt to which a base (NaOH, KOH, $NH_3$) has been added.

Preferred are calcium dihydroxide suspensions in the form of milks of lime. The use of calcium dihydroxide prepared from calcium oxide makes it possible, indeed, to avoid the presence of impurities in the calcium carbonate precipitated at the surface of the latex particles, in contrast to the suspensions emanating from, for example, calcium salts, which introduce ions in solution, such as $Cl^-$ or $NO_3^-$. It also permits a better control of the dispersion of the composite particles by reducing the ionic strength to a minimum.

The particle concentration of the calcium dihydroxide suspension advantageously ranges from 0.1 to 3 mol/kg.

Its viscosity advantageously ranges from 0.05 to 0.5 Pa.s (viscosity measured at 50 $s^{-1}$).

Conducting the process of the invention entails mixing the latex and the calcium dihydroxide suspension. This mixing can be carried out in any order whatever. Carbon dioxide in gaseous form is then introduced into the resulting mixture, whereby calcium carbonate is formed, which precipitates onto the latex particles in suspension in the mixture.

To preserve the stability of the latex during the aforesaid process and to prevent its flocculation, a stabilizer is generally added to the latex before it is contacted with the calcium dihydroxide.

The stabilizer may be a nonionic surfactant of the type: ethoxylated alkylphenol, polyethylene glycol and/or polyvinylpyrrolidone.

1 to 50 g of stabilizer are generally added per kg of latex, and preferably less than 20 g/kg.

In the event that a surfactant-type stabilizer is added to the reaction mixture to stabilize the latex, it may be necessary, simultaneously, to add a foam-suppressor to avoid the excessive presence of bubbles.

In a first embodiment of the process of the invention, an inhibitor of the growth of calcium carbonate can be introduced into the mixture of latex and of calcium dihydroxide. This inhibitor permits controlling the thickness of the layer of calcium carbonate precipitated at the surface of the latex particles.

It is advantageously selected from among citric acid, citrates and/or phosphate-based agents, or from the latex stabilizers indicated above.

The inhibitor is introduced into the reaction mixture before the carbon dioxide.

The process according to the invention is advantageously carried out at a temperature of from 20° C. to 40° C. The choice of the temperature makes it possible to vary the final specific surface of the calcium carbonate layer of the particles, insofar as the higher the temperature, the larger will be the size of the precipitated calcium carbonate particles deposited onto the surface of the latex particles.

During the process according to the invention, the carbon dioxide is preferably introduced in the form of a gaseous carbon dioxide/air or nitrogen mixture in a ratio of from 5% to 50% by volume, preferably on the order of 30%. The addition of the carbon dioxide is typically carried out by bubbling the gas mixture through the mixture of latex and of calcium dihydroxide.

The carbon dioxide is advantageously introduced into the mixture of latex and calcium dihydroxide at a flow rate ranging from 40 ml/h/kg to 200 l/h/kg of mixture of latex and of calcium dihydroxide. The flow rate may change as a function of the quantity of latex to be treated and the thickness of the calcium carbonate layer sought to be precipitated onto the latex particles.

In a second embodiment of the process of the invention, an additional stage is included, comprising a maturation stage after the precipitation of calcium carbonate on the latex particles. Its objective is to create a more spherical layer of calcium carbonate on the latex particles and to decrease the specific surface of this calcium carbonate layer at the surface of the latex particles. This stage of maturing, or aging, is effected by heating the reaction mixture, or simply by maintaining it undisturbed, or quiescent, at the temperature of reaction.

This invention also features a process for the preparation of organic polymer/calcium carbonate composite particles, wherein the suspensions obtained by the alternative processes described above are dried.

In a preferred embodiment of the invention, the separation of the composite particles from the reaction mixture and the drying thereof are carried out by atomization, namely, spraying the mixture into a hot atmosphere (spray-drying). The atomization may be carried out by means of any sprayer per se known to this art, for example using a spray nozzle of the watering rose or other type. So-called turbine atomizers may also be employed. For the various spraying techniques suitable for the present process, especially compare the fundamental text by Masters, *Spray-Drying*, Second edition, George Godwin Publishers (London, 1976).

It will be appreciated that it is also possible to conduct the spray-drying operation using a "flash" reactor, for example of the type described, especially, in FR-2,257,326, FR-2,419,754 and FR-2,431,321, assigned to the assignee hereof. In this event, the process gases (hot gases) are propelled with a helical motion and flow trajectory into a vortex constriction. The mixture to be dried is injected along a trajectory coinciding with the axis of symmetry of the helical trajectories of the gases, and this permits the total momentum of the gases to be transferred completely to the mixture to be treated. The gases thus perform, indeed, a dual function: on the one hand the comminution, namely, the conversion of the initial mixture into fine droplets and, on the other, the drying of the droplets obtained. Furthermore, the extremely short residue time (generally less than approximately 1/10 of a second) of the particles in the reactor presents the advantage, among others, of limiting possible risks of overheating as a result of an excessively long contact with the hot gases.

Depending on the respective flow rates of the gases and the mixture to be dried, the inlet temperature of the gases ranges from 400° to 900° C. and, more particularly, from 600° to 800° C., and the temperature of the dried solids ranges between 150° and 300° C.

In respect of the flash reactor referred to above, see especially that described in FIG. 1 of FR-2,431,321.

This includes a combustion chamber and a contact chamber comprising a venturi or a truncated cone whose upper end diverges. The combustion chamber opens into and communicates with a contact chamber via a small passage, or port of restricted flow opening.

The upper end of the combustion chamber is provided with an opening permitting the introduction of the combustible phase.

Furthermore, the combustion chamber includes a coaxial internal cylinder, thus defining therein a central region and an annular peripheral region, which has perforations, the majority of which are situated towards the upper end of the apparatus. The chamber includes at least six perforations distributed over at least one circle, but preferably over a plurality of axially spaced circles. The total area of the perforations located in the lower end of the chamber may be very small, on the order of 1/10 to 1/100 of the total area of the perforations of said coaxial internal cylinder.

The perforations are usually circular and are very small in thickness. The ratio of their diameter to the wall thickness is preferably at least 5, the minimum thickness of the wall being limited only by mechanical essentials.

Finally, a pipe elbow conduit emerges into the small passage, the end of which opens into the axis of the central region.

The gaseous phase driven with a helical motion (hereinafter the "helical phase") is composed of a gas, typically air, introduced into an orifice in the annular region; this orifice is preferably situated in the lower end of said region.

To obtain a helical phase at the port of restricted flow passage, the gaseous phase is preferably introduced at low pressure into such orifice, namely, at a pressure which is less than 1 bar and, more particularly, at a pressure which ranges from 0.2 to 0.5 bar above the pressure existing in the contact chamber. The velocity of this helical phase generally ranges from 10 to 100 m/s and preferably from 30 to 60 m/s.

Moreover, a combustible phase, which may be methane, in particular, is injected axially through the aforesaid opening into the central region at a velocity of approximately 100 to 150 m/s.

The combustible phase is ignited by any known means in the region where the fuel and the helical phase are contacted.

Next, the forced flow of the gases in the small passage is along a set of trajectories coinciding with groups of generatrices of a hyperboloid. The generatrices are based on a plurality of circles, of small-sized rings located near and below the port of restricted passage, before diverging in all directions.

The mixture to be treated is next introduced in the form of liquid through the aforesaid pipe inlet. The liquid is then broken up or disintegrated into a multitude of droplets, each of these being entrained by a unit volume of gas and subjected to a motion creating a centrifugal effect. The flow rate of the liquid typically ranges from 0.03 to 10 m/s.

The ratio of the amount of proper motion of the helical phase to that of the liquid mixture must be high. In particular, it is at least 100 and, preferably, ranges from 1,000 to 10,000. The quantities of motion or momentum at the port of restricted flow are calculated as a function of the inlet flow rates of the gas, of the mixture to be treated, and of the cross-section of said passage. An increase in the flow rates produces an increase in the size of the drops.

Under these conditions, the proper motion of the gases is imposed in its direction and its intensity on the drops of the mixture to be treated, which are separated from one another in the region of convergence of the two streams. The velocity of the liquid mixture is additionally reduced to the minimum required to attain a continuous flow.

In another preferred embodiment of the invention, atomization is carried out in such manner that the temperature of inlet into the atomizer is on the order of 200° C. and that at the outlet of 120° C.

The composite particles in suspension may be optionally subjected to a treatment imparting water-repellency prior to the atomization operation, to prevent their agglomeration during this atomization stage. This treatment imparting water-repellency is found to be more or less necessary, depending on the chemical nature of the agent for treatment imparting water-repellency and on that of the suspension medium.

The invention additionally features a process for the preparation of the hollow calcium carbonate particles described above which, in a first embodiment of the invention, is characterized in that the composite particles comprising an organic polymer core covered with calcium carbonate are calcined. The calcination is carried out at a temperature which is sufficient for the organic polymer core of the composite particles to be decomposed into gases. This temperature typically ranges from 400° to 700° C. and, more particularly, is about 650° C. During this calcination, the organic polymer core is completely decomposed into gases, which are emitted through the calcium carbonate shell, creating a hollow particle.

In a preferred variant of the first embodiment, the composite particles are subjected to a temperature increase on the order of 3° C./min until the temperature of 650° C. is attained. The particles are then maintained at this temperature for 5 hours.

In a second embodiment, the process for the preparation of the hollow calcium carbonate particles is characterized in that the composite particles comprising an organic polymer core covered with calcium carbonate are introduced into a solvent for the organic polymer, whereby the organic polymer core is dissolved. The mixture is then centrifuged and the hollow particles obtained are dried. The drying is carried out at a temperature ranging from 25° to 200° C.

Lastly, this invention also features the use of the composite particles as fillers or additives in plastics and elastomers.

These products are employed, in particular, for any plastics intended to be reinforced against impacts, such as polyolefins, polyvinyl chlorides and derivatives thereof, polyamides, polystyrenes, etc.

It has, thus, now been found that formulating the composite particulates according to the invention into plastic materials imparts a good rigidity thereto and, at the same time, a higher impact strength.

These particles can also be formulated into elastomers such as natural rubber, polyisoprene, polybutadiene and copolymers of butadiene and of styrene.

It has been determined that the introduction of the composite particles of the invention imparts low-temperature flexibility to the elastomers.

This invention also features the use of the hollow particles as fillers for elastomers. These particles are preferably formulated, or compounded, into elastomers such as those indicated above.

It is found that elastomers and, in particular, vehicle tires, acquire a greater low-temperature flexibility as a result of the introduction of the hollow particles of the invention into the matrix material.

In order to further illustrate the present invention and the advantages thereof, the following specific examples are given, it being understood that same are intended only as illustrative and in nowise limitative.

EXAMPLE 1

A latex was employed of the SB112 type marketed by Rhône-Poulenc; it was a styrene/butadiene/acrylamide anionic terpolymer of Tg≃0° C.

The stabilizer employed for this latex was the surfactant Cemulsol NP30, which is ethoxylated nonylphenol.

Operating conditions:

T=25° C.

TABLE I

| Reactants | Reactant mass or flow rate | Characteristics |
| --- | --- | --- |
| SB112 Latex in suspension, in water, having a solids content of 30.25% | 74.10 g | mean diameter = 135 nm |

TABLE I-continued

| Reactants | Reactant mass or flow rate | Characteristics |
| --- | --- | --- |
| Milk of lime containing 2.76 mol/kg of Ca(OH)$_2$ | 18.28 g | viscosity = 0.05 Pa · s |
| Purified water | 904.51 g | |
| Cemulsol NP30 | 3.11 g | |
| CO$_2$ in the form of CO$_2$/air mixture containing 30% of CO$_2$ | 40 ml/h/kg | |

The SB112 latex was introduced into a reactor and then a mixture, prepared beforehand, containing the Cemulsol NP30 and the purified water, was added with stirring. The milk of lime was then poured into the reaction mixture and carbon dioxide was bubbled therein. Stirring was continued throughout the reaction.

The resistivity of the mixture was measured in parallel. When it became higher than 0.5 kΩ, the bubbling of CO$_2$ was terminated.

A suspension of composite particles comprising an organic polymer core covered or coated with calcium carbonate, which were completely individualized, having a diameter of 140 nm, measured by TEM, was obtained.

The dispersion index was 0.4.

The concentration of the suspension was 2.7% by weight.

EXAMPLE 2

Preparation of a Dispersion According to the Invention

The reactants employed were the same as in Example 1.

However, a foam-suppressor was added in this instance, i.e, Rhodorsyl® marketed by Rhône-Poulenc, because of the formation of foams.

TABLE II

| Reactants | Reactant mass or flow rate | Characteristics |
| --- | --- | --- |
| SB112 Latex having a solids content of 60% | 212.5 g | mean diameter = 135 nm |
| Cemulsol NP30 | 17.7 g | |
| Rhodorsyl: emulsion having a solids content of 10% | 30 g | |
| Purified water | 212.5 g | |
| Milk of lime containing 3.096 mol/kg of Ca(OH)$_2$ | 590 g | viscosity = 0.05 Pa · s |
| CO$_2$ in the form of CO$_2$/N$_2$ mixture containing 10% of CO$_2$ | 220 1/h/kg | |

The SB112 latex was introduced into a reactor and then a mixture, prepared beforehand, containing the Cemulsol, the purified water and the Rhodorsyl, was added with stirring. The milk of lime was then poured into the reaction mixture and carbon dioxide was bubbled therein. Stirring was continued throughout the reaction.

The resistivity of the mixture was measured in parallel. When it became higher than 0.500 kΩ, which corresponded to a reaction for 5 h, the bubbling of CO$_2$ was terminated.

A suspension of composite particles comprising an organic polymer core covered or coated with calcium carbonate, which were completely individualized, having a diameter of 160 nm, measured by TEM, was obtained.

The composite particle concentration of the suspension was 30% by weight.

The inorganic carbon content of the suspension of composite particles was 15.8 g/l, namely, a $CaCO_3$ concentration of 132.5 g/l.

EXAMPLE 3
Preparation of a Suspension According to the Invention

The reactants employed were the same as in Example 1.
Operating conditions:
T=25° C.

TABLE III

| Reactants | Reactant mass or flow rate | Characteristics |
| --- | --- | --- |
| SB112 Latex in suspension, in water, having a solids content of 30.25% | 71.4 g | mean diameter = 135 nm |
| Milk of lime containing 2.60 mol/kg of $Ca(OH)_2$/kg | 47.5 g | viscosity = 0.05 Pa · s |
| Purified water | 927.76 g | |
| Cemulsol NP30 | 3.14 g | |
| $CO_2$ in the form of $CO_2/N_2$ mixture containing 30% of $CO_2$ | 220 1/h/kg | |

The SB112 latex was introduced into a reactor and then a mixture, prepared beforehand, containing the Cemulsol and the purified water, was added with stirring. The milk of lime was then poured into the reaction mixture and carbon dioxide was bubbled therein. Stirring was continued throughout the reaction.

The resistivity of the mixture was measured in parallel. When it became higher than 0.500 kΩ, the bubbling of $CO_2$ was terminated.

A suspension of composite particles comprising an organic polymer core covered or coated with calcium carbonate, which were completely individualized, having a diameter of 145 nm, measured by TEM, was obtained. The theoretical thickness of the calcium carbonate layer was 5 nm.

The concentration of the suspension was 3.2% by weight.

EXAMPLE 4
Preparation of a Suspension According to the Invention

The reactants employed were the same as in Example 1.
Operating conditions:
T=25° C.

TABLE IV

| Reactants | Reactant mass or flow rate | Characteristics |
| --- | --- | --- |
| SB112 Latex in suspension, in water, having a solids content of 29.57% | 75.89 g | mean diameter = 135 nm |
| Milk of lime containing 2.80 mol/kg of $Ca(OH)_2$/kg | 56.42 g | viscosity = 0.05 Pa · s |
| Purified water | 918.02 g | |
| Cemulsol NP30 | 3.16 g | |
| $CO_2$ in the form of $CO_2/N_2$ mixture containing 30% of $CO_2$ | 220 1/h/kg | |

The SB112 latex was introduced into a reactor and then a mixture, prepared beforehand, containing the Cemulsol and the purified water, was added with stirring. The milk of lime was then poured into the reaction mixture and carbon dioxide was bubbled therein. Stirring was continued throughout the reaction.

The resistivity of the mixture was measured in parallel. When it became higher than 0.5 kΩ, the bubbling of $CO_2$ was terminated.

A suspension of composite particles comprising an organic polymer core covered or coated with calcium carbonate, which were completely individualized, having a diameter of 155 nm, measured by TEM, was obtained. The theoretical thickness of the calcium carbonate layer was 10 nm.

The composite particle concentration of the suspension was 3.6% by weight.

EXAMPLE 5
Preparation of a Suspension According to the Invention

The reactants employed were the same as in Example 1.
Operating conditions:
T=25° C.

TABLE V

| Reactants | Reactant mass or flow rate | Characteristics |
| --- | --- | --- |
| SB112 Latex in suspension, in water, having a solids content of 30.25% | 74.04 g | mean diameter = 135 nm |
| Milk of lime containing 2.80 mol/kg of $Ca(OH)_2$/kg | 113.21 g | viscosity = 0.05 Pa · s |
| Purified water | 861.23 g | |
| Cemulsol NP30 | 3.16 g | |
| $CO_2$ in the form of $CO_2/N_2$ mixture containing 30% of $CO_2$ | 220 1/h/kg | |

The SB112 latex was introduced into a reactor and then a mixture, prepared beforehand, containing the Cemulsol and the purified water, was added with stirring. The milk of lime was then poured into the reaction mixture and carbon dioxide was bubbled therein. Stirring was continued throughout the reaction.

The resistivity of the mixture was measured in parallel. When it became higher than 0.5 kΩ, the bubbling of $CO_2$ was terminated.

A suspension of composite particles comprising an organic polymer core covered or coated with calcium carbonate, which were completely individualized, having a diameter of 170 nm, measured by TEM, was obtained.

The theoretical thickness of the calcium carbonate layer was 20 nm.

The composite particle concentration of the suspension was 5.2% by weight.

EXAMPLE 6
Preparation of Composite Particles

The suspension obtained in Example 2 was dried using a Buchi atomizer. The temperature of inlet was 207° C. and that at the outlet was 122° C.

A powder of spherical composite particles comprising an organic polymer core coated with calcium carbonate was obtained.

EXAMPLE 7
Preparation of Hollow Particles According to the Invention

The powder contained in Example 6 was calcined at 630° C., the rate of temperature increase being 3° C./min and the duration of the plateau at 630° C., 4 hours.

Hollow particles of calcium carbonate having a diameter smaller than 0.2 μm (by TEM) were thus obtained.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A liquid medium suspension of composite core/sheath particulates comprising an organic polymer core at least partly coated with calcium carbonate, said core/sheath particulates having a mean particle size not exceeding 5 μm.

2. The liquid suspension as defined by claim 1, comprising an aqueous liquid medium.

3. The liquid suspension as defined by claim 1, comprising a hydroalcoholic liquid medium.

4. The liquid suspension as defined by claim 1, comprising a colloidal dispersion.

5. A shaped plastic substrate containing a filler amount of composite core/sheath particulates comprising an organic polymer core at least partly coated with calcium carbonate, said core/sheath particulates having a mean particle size not exceeding 5 μm.

6. A shaped elastomer substrate containing a filler amount of composite core/sheath particulates comprising an organic polymer core at least partly coated with calcium carbonate, said core/sheath particulates having a mean particle size not exceeding 5 μm.

7. A shaped plastic substrate containing an effective impact strength and rigidity reinforcing amount of composite core/sheath particulates comprising an organic polymer core at least partly coated with calcium carbonate, said core/sheath particulates having a mean particle size not exceeding 5 μm.

8. A shaped elastomer substrate containing an effective low-temperature flexibility enhancing amount of composite core/sheath particulates comprising an organic polymer core at least partly coated with calcium carbonate, said core/sheath particulates having a mean particle size not exceeding 5 μm.

* * * * *